June 14, 1955
J. TITTEL ET AL
2,710,931
SLOT CLOSURE WEDGES FOR ELECTRIC MACHINES
Filed Aug. 8, 1952
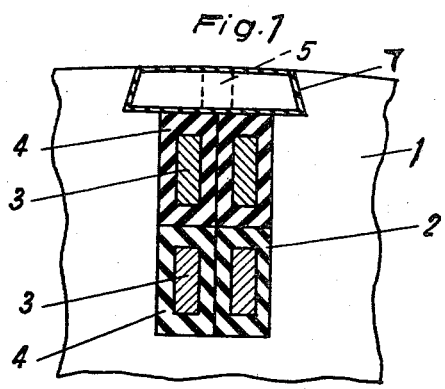
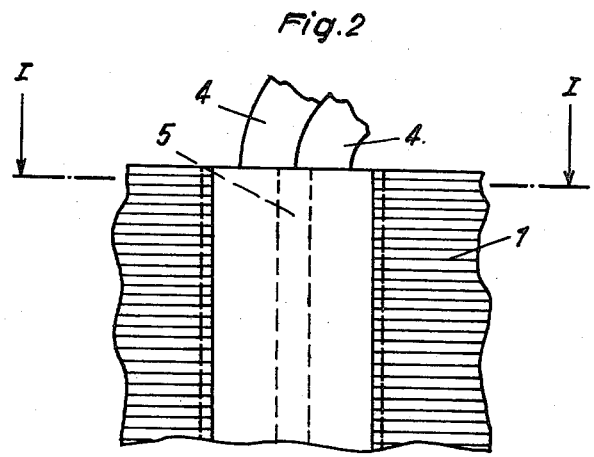
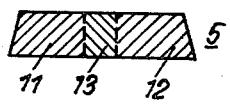
Inventors:
Josef Tittel
Ulrich Baumann
Karl Ott, Deceased
By C. M. Avery
Attorney

United States Patent Office 2,710,931
Patented June 14, 1955

2,710,931

SLOT CLOSURE WEDGES FOR ELECTRIC MACHINES

Josef Tittel, Berlin-Lubars, Ulrich Baumann, Berlin-Wilmersdorf, Germany, and Karl Ott, deceased, late of Berlin-Charlottenburg, Germany, by Ilse Ott, heir and guardian of minor heir Hansgeorg Ott and Rudolf Ott, heir, Berlin-Charlottenburg, Germany, assignors to Siemens-Schuckertwerke Aktiengesellschaft, Berlin-Siemensstadt, Germany, a corporation of Germany Application August 8, 1952, Serial No. 309,706

Claims priority, application Germany August 9, 1951

5 Claims. (Cl. 310—214)

Our invention relates to closure wedges for securing the windings of electric machines in the winding slots of the magnetizable machine structures such as the rotor and stator of a generator or motor.

The design and manufacture of such machines involves the difficulty that it is desirable on the one hand to keep the slot openings as wide as possible to facilitate inserting the windings, while on the other hand the slots should be as narrow as possible for electrical reasons. Hence, a compromise, involving a disadvantage from either or both viewpoints, is usually required.

It is an object of our invention to provide the possibility of making the slots as wide as desired from the production viewpoint while also affording a fargoing compliance with the electrical desiderata. In connection with this object, the invention makes use of the known method of producing the closure wedges by a powder-metallurgical sintering method.

According to our invention, we compose the agglomerate body of a sintered slot-closure wedge of different but integrally joined zones of predominantly magnetic metal and predominantly nonmagnetic metal. According to a more specific feature of our invention, we provide a middle zone of predominantly non-magnetic metal and two adjacent end zones of predominantly magnetic metal.

The foregoing and other objects and features of our invention will be apparent from the following description in conjunction with the drawing in which Fig. 1 shows a fragmentary sectional view and Fig. 2 a top view of the magnetizable structure of a dynamoelectric machine, the section plane of Fig. 1 being indicated in Fig. 2 at I—I. Fig. 3 shows a schematic cross section of a slot closure wedge pertaining to the machine according to Figs. 1 and 2; and Fig. 4 shows a schematic cross sectional view of another embodiment of such a wedge.

The magnetizable structure shown in Figs. 1 and 2 consists essentially of a laminated stack 1 of sheeted dynamo steel. The stack has a number of slots for accommodating the machine windings, one of these slots being shown at 2. The slot is substantially filled by four winding bars 3 each enclosed by insulation 4. The windings are firmly secured in position by means of closure wedges such as the one shown at 5. Each wedge extends across the opening of the slot and is driven into grooves in the slot walls and firmly wedged in its seat. It will be understood that the shape and size of the slot, the number and size of the windings and the size and shape of the closure wedge are not essential to the invention proper and may be modified in accordance with the requirements of each particular machine design.

The wedge 5 consists of a sintered agglomerate of metal particles. That is, the wedge is produced from metal powder by compacting the powder in a mold and then sintering the molded powder body at a temperature below the melting point of the metal. According to the invention the wedge is composed of different zones. Three such zones are schematically indicated in Figs. 1 and 2 by broken lines and are more clearly apparent from the cross section of the wedge 5 separately shown in Fig. 3 where the zones are denoted by 11, 12, 13 and schematically differentiated by differently slanted cross hatching.

The two zones 11 and 12 at the ends of the wedge 5 consist preferably of magnetically conductive metal preferably iron powder. The middle zone 13 consists of predominantly non-magnetic metal powder, for instance, copper. The three zones are sintered together and form an integral wedge body usually with a more or less gradual transition between the adjacent zones.

In known machine designs it is often necessary to drive the wedge into its seat from the front side of the magnetizable stack structure, for instance, from the top side of the structure in Fig. 2. This entails the danger that the slot walls and the edges of the wedge may become damaged. This danger can be eliminated by virtue of another feature of the invention which permits inserting the sintered wedge from above into the slot, i. e. from the top of illustration in Fig. 1. This is possible because the density and elongation of such sintered wedges can readily be chosen to give the wedge a certain plastic deformability. According to the invention such a sintered slot closure wedge is therefore so dimensioned that it can be inserted from above into the slot and can thereafter be subjected to a deforming blow or pressure so that it becomes firmly seated and wedged in the slot due to the elastic tension to which the deformed wedge remains subjected. To this end the wedge is given, for instance, an arcuate cross sectional shape as illustrated in Fig. 4 in a purposely exaggerated manner.

The wedge 6 according to Fig. 4 has a width $a$ slightly smaller than the width of the slot walls against which it is to be seated. After inserting the wedge 6, pressure or impact is applied to its top so that the wedge becomes forced into the slot and bulges somewhat toward the opposite side, i. e. downwardly with reference to Fig. 4. Due to its plastic deformation, the wedge then remains in the deformed state and remains subjected to elastic tension which fastens it into the slot with complete security. A wedge material having a plastic deformation of up to about 30% is well suitable for this purpose. A somewhat porous material is preferable because it can readily be given the desired deformability and becomes compacted and strengthened due to the impact or pressure forces thus becoming less deformable and assuming a higher elastic limit once the wedge is driven into the slot in the above-described manner.

To avoid shorting the individual iron sheets of the laminated stack 1 by the wedge, it is preferable to provide insulation between the slot walls and the wedge. This insulation may consist, for instance, of a foil of suitable insulating material, such as paper, which is inserted into the slot or slot groove prior to the insertion of the wedge. However, the wedge or the slot wall or both may also be provided with an insulating impregnation or with a coating of insulating varnish. An insulating coating may also be produced by subjecting the wedge to oxidizing treatment so that its surface becomes coated with a metal oxide, such an oxide coating being indicated in Fig. 1 at 7.

It will be recognized that when a wedge according to the invention is seated in the slot it, so to say, extends the edge or border of the magnetizable machine structure somewhat into the slot area. Consequently, the wedge can be given a larger width than otherwise possible without appreciably impairing the desired electromagnetic properties of the machine structure. The proportion of the zones of magnetically conductive and magnetically reluctant metal, in other words the width of the magnetic middle zone of the wedge, may be varied and adapted to any particular requirements. As mentioned the shape and size of the wedge may also depart from the schematically illustrated examples in accordance with any particular requirements.

We claim:

1. A slot closure wedge for electric machines, consisting essentially of a sintered powder body and having alternate zones of magnetizable metal and non-magnetic metal joined with each other, said wedge body having a curved shape and being plastically deformable into flatter shape.

2. A slot closure wedge for electric machines, consisting essentially of a sintered powder body and having alternate zones of magnetizable metal and non-magnetic metal joined with each other, said wedge body being porous and up to about 30% plastically deformable so as to become deformed and strengthened when subjected to pressure.

3. A slot closure wedge for electric machines, consisting essentially of a sintered powder body having a middle zone of non-magnetizable metal and two outer zones of magnetic metal, said three zones being integrally joined with each other, and an electrically insulating oxide coating on said body.

4. A closure wedge for winding-slots of dynamo-electric machines comprising an elongated integral sintered powdered metal member having a longitudinal central portion of non-magnetic metal bounded by side longitudinal portions of magnetic metal.

5. A wedge for closing winding-slots of electric machines comprising an elongated member having a longitudinal zone of sintered non-magnetic metal powder and a longitudinal zone of sintered magnetic metal powder, said zones being sintered together and forming a unitary structure.

References Cited in the file of this patent

UNITED STATES PATENTS

| | | |
|---|---|---|
| 880,429 | Treat | Feb. 25, 1908 |
| 917,138 | Robinson | Apr. 6, 1909 |
| 1,231,588 | Frederick et al. | July 3, 1917 |
| 1,891,200 | Eaton | Dec. 13, 1932 |
| 2,134,795 | Myers | Nov. 1, 1938 |
| 2,201,699 | Myers | May 21, 1940 |
| 2,341,732 | Marvin | Feb. 15, 1944 |
| 2,386,673 | Fisher | Oct. 9, 1945 |
| 2,451,633 | Perrigo | Oct. 19, 1948 |
| 2,549,939 | Shaw et al. | Apr. 24, 1951 |
| 2,610,225 | Korski | Sept. 9, 1952 |

FOREIGN PATENTS

| | | |
|---|---|---|
| 259,611 | Great Britain | May 10, 1928 |
| 227,953 | Great Britain | Jan. 29, 1925 |
| 448,851 | France | Dec. 7, 1912 |